(12) United States Patent
Vinogradov et al.

(10) Patent No.: US 6,820,810 B2
(45) Date of Patent: Nov. 23, 2004

(54) OPTICAL COLLECTOR FOR IMPROVING SENSOR SIGNAL UNIFORMITY OVER A TARGET SCAN

(75) Inventors: Igor Vinogradov, Bay Shore, NY (US); Mark Krichever, Hauppague, NY (US); David Tsi Shi, Stony Brook, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/287,343

(22) Filed: Nov. 4, 2002

(65) Prior Publication Data

US 2003/0106938 A1 Jun. 12, 2003

Related U.S. Application Data

(60) Provisional application No. 60/335,956, filed on Nov. 2, 2001.

(51) Int. Cl.[7] ............................. G06K 7/10; G06K 7/14
(52) U.S. Cl. ............................................. 235/454; 359/205
(58) Field of Search ................................. 235/454, 455, 235/462.01, 462.26, 462.32, 462.33, 462.42; 359/205, 793, 795

(56) References Cited

U.S. PATENT DOCUMENTS

| 5,473,471 | A | * | 12/1995 | Yamagata et al. | .......... 359/569 |
|---|---|---|---|---|---|
| 6,008,953 | A | * | 12/1999 | Itoh | ........................... 359/692 |
| 6,045,045 | A | * | 4/2000 | Detwiler | ..................... 235/114 |
| 6,585,161 | B1 | * | 7/2003 | Acosta | ..................... 235/462.4 |

* cited by examiner

*Primary Examiner*—Thien M. Le
*Assistant Examiner*—Lisa M. Caputo
(74) *Attorney, Agent, or Firm*—Kirschstein, et al.

(57) ABSTRACT

An optical collector collects relatively more of the off-axis light directed to a detector, and collects relatively less of the on-axis light directed to the detector, in order to decrease the variation in the amplitude of the electrical signal generated by the detector over a scan of target such as a bar code symbol in order to improve the performance of a bar code symbol reader.

8 Claims, 1 Drawing Sheet

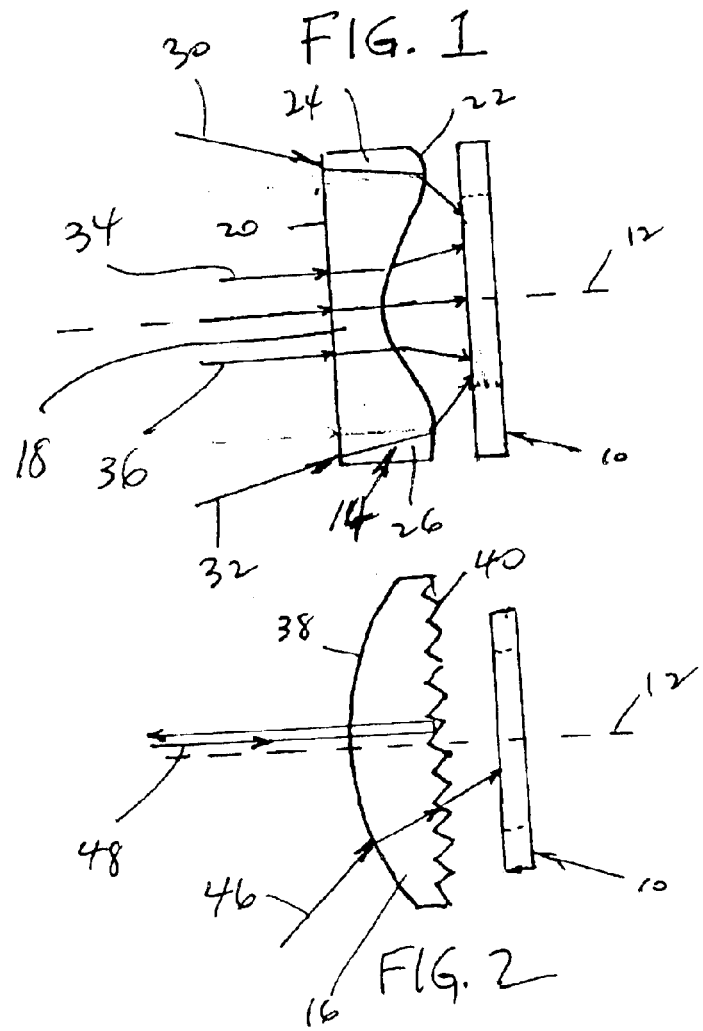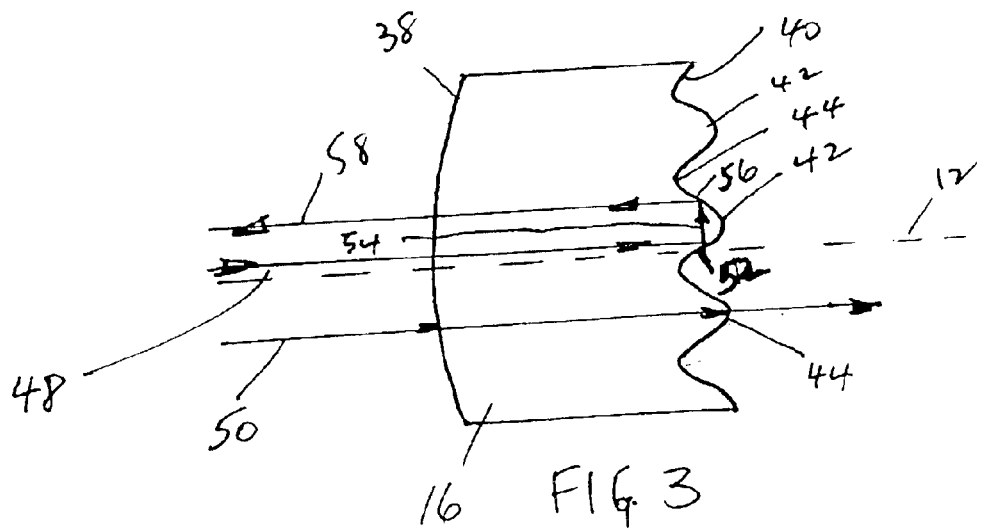

OPTICAL COLLECTOR FOR IMPROVING SENSOR SIGNAL UNIFORMITY OVER A TARGET SCAN

CROSS REFERENCE TO RELATED APPLICATIONS

This application claims the priority benefit of U.S. Provisional Patent Application Ser. No. 60/335,956, filed Nov. 2, 2001.

BACKGROUND OF THE INVENTION

1. Field of the Invention

The present invention generally relates to improving the uniformity of signals generated by a light sensor over a scan of a target and, more particularly, to collecting different amounts of light reflected off a bar code symbol from different regions of the scan, and directing such different amounts to a light detector for conversion into electrical signals whose amplitudes are more uniform over the scan of the symbol.

2. Description of the Related Art

In the field of electro-optically reading bar code symbols, it is well known to sweep a light beam across a symbol for reflection therefrom, to scan the beam and/or a field of view of a light detector in a scan across the symbol, to detect light reflected off the symbol with the detector, to convert the detected light into an electrical signal, and to process the signal into data related to the symbol.

The amplitude of the electrical signal generated by the detector is a function of several factors. For example, as described in U.S. Pat. No. 4,409,470, the amplitude is a function of the distance at which the symbol is located relative to the sensor. A symbol that is located closer to the sensor reflects more light to the sensor and, hence, the electrical signal has a larger amplitude as compared to a symbol that is further away from the sensor. The amplitude variation between such close-in and far-out symbols could be electronically compensated, but, as described in said patent, could also be optically compensated, thereby minimizing the variation for symbols located anywhere in a depth of field of a bar code reader.

The amplitude of the electrical signal generated by the detector is also a function of scan angle or location along the scan. Thus, in the case where a laser beam is swept along a single scan line across a symbol located at a given distance relative to the detector, the amount of reflected light collected from the end regions of the scan line is lower than the amount of reflected light collected from an intermediate region of the scan line between the end regions. Thus, the electrical signal generated by the detector is lower in amplitude for light reflected from the end regions of the scan line, and is higher in amplitude for light reflected from the intermediate region.

Put another way, the detector has an optical axis, and the light reflected from the end regions travels along a direction that is inclined relative to the axis, and the light reflected from the intermediate region travels along a direction that is generally parallel to the axis. The light from the end regions, also called "off-axis" light, has a greater scan angle than the light from the intermediate region, also called "on-axis" light. Thus, the amplitude of the electrical signal generated by the detector is also a function of scan angle and varies over the scan.

In order to achieve reliable performance of the bar code symbol reader, the variation of the electrical signal versus scan angle must be minimized. Without signal uniformity, complex and expensive electronic compensation circuitry is needed and, if not provided, will significantly limit reader performance.

SUMMARY OF THE INVENTION

OBJECTS OF THE INVENTION

Accordingly, it is a general object of this invention to improve the performance of a bar code symbol reader.

More particularly, it is an object of the present invention to minimize electrical signal amplitude variation as a function of scan angle.

Still another object of the present invention is to collect light in different amounts from a target over a scan and to distribute the collected light to a sensor in order to render the signal variation more uniform.

FEATURES OF THE INVENTION

In keeping with the above objects and others which will become apparent hereinafter, one feature of the present invention resides, briefly stated, in an optical collector for collecting light reflected from, and scanned in a scan across, a target, for example, a bar code symbol. The collector is used with a light sensor, for example, a photodiode, having an optical axis and operative for sensing incident light and for converting the sensed light to an electrical signal indicative of the symbol.

The collector includes first and second collecting portions preferably integrated into a single component. The first portion collects relatively more of the light reflected along directions that are generally inclined relative to the axis, i.e., "off-axis" light traveling along a non-zero or relatively larger scan angle, and directs the off-axis light to the sensor. The second portion collects relatively less of the light reflected along directions that are generally parallel relative to the axis, i.e., "on-axis" light traveling along a zero or relatively smaller scan angle, and directs the on-axis light to the sensor. The off-axis light originates from spaced-apart end regions of the scan. The on-axis light originates from an intermediate region of the scan between the end regions thereof.

The amplitude of the electrical signal generated by the sensor varies with the scan angle. Typically, the amplitude varies as the fourth power of the cosine of the scan angle. Hence, according to the prior art, the signal generated from off-axis light is weakest at the ends of the scan where the scan angle is greatest, and the signal generated from on-axis light is strongest at the middle of the scan where the scan angle is a minimum.

In accordance with this invention, by collecting more of the light from the ends of the scan, the amplitude of the signal from the ends of the scan is increased, and by collecting less of the light from the middle of the scan, the amplitude of the signal from the middle if the scan is decreased. The result is that the signal amplitude variation over the scan is minimized. Reader performance is enhanced and rendered more reliable without having to resort to complex electronic compensation circuitry.

The novel features which are considered as characteristic of the invention are set forth in particular in the appended claims. The invention itself, however, both as to its construction and its method of operation, together with additional objects and advantages thereof, will be best understood from the following description of specific

BRIEF DESCRIPTION OF THE DRAWINGS

FIG. 1 is a side view of one embodiment of an optical collector according to this invention;

FIG. 2 is a side view of another embodiment of an optical collector according to this invention; and FIG. 3 is an enlarged view of a central area of the embodiment of FIG. 2.

DETAILED DESCRIPTION OF THE PREFERRED EMBODIMENTS

Reference numeral 10 in FIGS. 1 and 2 identifies a light sensor, typically a photodiode, having an aperture for receiving and detecting incident light, and for converting the detected light into an electrical signal. Such a sensor is conventionally employed in a bar code symbol reader in which a light beam and/or a field of view of the sensor is scanned in a scan across a symbol. Light reflected from the symbol is collected by a collection system that includes the sensor. The electrical signal generated by the sensor is conventionally digitized and decoded to generate data related to the symbol.

As described above, the amplitude of the electrical signal varies as a function of scan angle, i.e., the direction in which the reflected light travels to the sensor. The scan angle changes over the extent of the scan. Thus, if the light beam is swept along a linear course, a scan line extends along the symbol. The scan angle is larger for light reflected from opposite end regions of the scan line, and is smaller, or even zero, for light reflected from a middle region of the scan line. The scan angle is measured relative to an optical axis 12 of the sensor.

The electrical signal amplitude typically varies as the fourth power of the cosine of the scan angle. The light from the end regions (off-axis light) of the scan is relatively weak, whereas the light from the middle region (on-axis light) of the scan is relatively strong. Thus, the signal amplitude is lower for off-axis light than for on-axis light, and it is this variation that limits reader performance.

To improve performance, a shaped focusing lens 14 in FIG. 1, or a shaped optical component 16 in FIG. 2, is used to minimize the amplitude variation. Lens 14 has a pair of surfaces 20, 22 whose thickness is at a minimum at middle section 18 and a maximum at end sections 24, 26. Surface 22 has a curved shape and, as shown, a cosinusoidal profile. The end sections 24, 26 or first collecting portions are convexly curved and have a positive power for optically collecting relatively more of the light, for example, off-axis rays 30, 32 reflected from the end regions of the scan line. The middle section 18 or second collecting portion is concavely curved and has a negative power for optically collecting relatively less of the light, for example, on-axis rays 34, 36 reflected from the middle region of the scan.

The first portions 24, 26 direct the collected light to the detector and increase the light intensity thereon, while the second portion 18 directs the collected light to the detector and decreases the light intensity thereon. Hence, the weaker signal is increased and the stronger signal is decreased, thereby decreasing the variation in light intensity incident on the detector and, in turn, decreasing the variation of the electrical signal generated by the detector.

The component 16 in FIG. 2 has a curved front surface 38 and a periodic shaped surface 40 having peaks or ridges 42 alternating with valleys or troughs 44 (see FIG. 3) The periodic surface is sinusoidally shaped. The component 16 is light transmissive.

As shown in FIG. 2, a representative off-axis ray 46 will refract into the component 16 and be directed toward the detector. More of the off-axis light is thus collected to increase the light intensity on the detector and increase the amplitude of the heretofore weaker signal produced by the detector.

Representative on-axis rays 48, 50 either pass through the component 16, or are prevented from passing through the component, depending on where each ray strikes the periodic surface 40. As best seen in FIG. 3, the ray 48 is incident on the periodic surface at a sloped wall 52. If this ray is incident on the sloped wall at an angle equal to or greater than the critical angle, then total internal reflection (TIR) occurs, and the reflected ray 54 is incident on another sloped wall 56 where TIR again occurs. The reflected ray 58 exits the component 16 in a direction opposite and generally parallel to the incoming ray 48. As for ray 50, it does not undergo TIR and merely passes through to the detector.

Nevertheless, the number of on-axis rays which can reach the detector is reduced, and the light intensity on the detector is decreased. The amplitude of the heretofore stronger signal produced by the detector is decreased.

Although the components 14, 16 can be made of any light-transmissive material such as glass, a plastic material is preferred primarily because the shaped surfaces 22, 40 are more easily formed by molding. The shaped surfaces need not be formed on the surface nearest the detector, but can be formed on the surface furthest away from the detector.

An optical filter can likewise be incorporated into each component 14, 16 in order to increase the signal-to-noise ratio.

The scan need not be a single line, as described above, but can be any scan pattern including a raster pattern of parallel scan lines or an intersecting line pattern, or an omni-directional scan pattern.

Likewise, the target need not be a symbol such as a one- or two-dimensional symbol, but can be any indicia.

It will be understood that each of the elements described above, or two or more together, also may find a useful application in other types of constructions differing from the types described above.

While the invention has been illustrated and described as embodied in an optical collector for improving sensor signal uniformity over a target scan, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a light collection system including a light sensor having an optical axis, an optical collector for collecting light reflected from, and scanned in a scan across, a target, the optical collector comprising:

a) a first collecting portion for optically collecting relatively more of the light reflected along directions that are generally inclined relative to the axis and from spaced-apart end regions of the scan, and for directing the collected light to the sensor with an increased intensity thereon; and b) a second collecting portion having a negative power for collecting relatively more of the light reflected along directions that are generally parallel relative to the axis and from an intermediate region of the scan between the end regions, and for directing the collected light to the sensor with a decreased intensity thereon, thereby decreasing light intensity variation over the scan, the first and second collecting portions being integral parts of a collection lens.

2. The collector of claim 1, wherein the second collecting portions is centered on the optical axis, and wherein the first collection portion is spaced radially from the optical axis.

3. The collector of claim 1, wherein the lens has opposite surfaces, at least one of the surfaces being shaped with curved profile in which a thickness dimension of the lens between the surfaces is a minimum value on the axis and is a maximum value radially from the axis.

4. The collector of claim 3, wherein the profile is a cosinusoidal wave.

5. In a light collection system including a light sensor having an optical axis, an optical collector for collecting light reflected from, and scanned in a scan across, a target, the optical collector comprising:

a) a first collecting portion for optically collecting relatively more of the light along directions that are generally inclined relative to the axis and from spaced-apart end regions of the scan, and for directing the collected light to the sensor with an increased intensity thereon; and b) a second collecting portion for optically collecting relatively less of the light reflected along directions that are generally parallel relative to the axis and from an intermediate region of the scan between the end regions, and for directing the collected light to the sensor with a decreased intensity thereon, thereby decreasing light intensity variation over the scan, the first and second collecting portions being integral parts of light-transmissive component having opposite surface, at least one of the surfaces being formed with ridges alternating wit troughs.

6. The collector of claim 5, wherein at least one of the ridges at the axis forms an angle with an adjacent trough, the angle being greater than a critical angle so that at least a part of the light traveling generally parallel to the axis is totally internally reflected and is blocked from reaching the sensor.

7. The collector of claim 5, wherein said at least one surface is a sinusoidal wave.

8. The collector of claim 5, wherein the first and second collecting portions are integrally molded in a single component.

* * * * *